United States Patent
Kuttner

(10) Patent No.: US 9,054,769 B2
(45) Date of Patent: Jun. 9, 2015

(54) PRE-PROCESSING UNIT FOR A SIGNAL PROCESSOR

(71) Applicant: Franz Kuttner, Villach (AT)

(72) Inventor: Franz Kuttner, Villach (AT)

(73) Assignee: Intel Mobile Communications GmbH, Neubiberg (DE)

( * ) Notice: Subject to any disclaimer, the term of this patent is extended or adjusted under 35 U.S.C. 154(b) by 213 days.

(21) Appl. No.: 13/651,978

(22) Filed: Oct. 15, 2012

(65) Prior Publication Data
US 2014/0105255 A1    Apr. 17, 2014

(51) Int. Cl.
*H04B 1/12* (2006.01)
(52) U.S. Cl.
CPC . *H04B 1/12* (2013.01); *H04B 1/123* (2013.01)
(58) Field of Classification Search
CPC ...................................................... H04B 1/123

USPC .................................................. 375/319, 219
See application file for complete search history.

(56) References Cited

U.S. PATENT DOCUMENTS

| | | | |
|---|---|---|---|
| 5,903,823 A * | 5/1999 | Moriyama et al. | 455/126 |
| 2008/0143436 A1 | 6/2008 | Xu | |
| 2009/0289709 A1 | 11/2009 | Khoury et al. | |
| 2011/0243216 A1 * | 10/2011 | Yoshioka et al. | 375/238 |

* cited by examiner

*Primary Examiner* — Michael Neff
(74) *Attorney, Agent, or Firm* — Eschweiler & Associates, LLC

(57) ABSTRACT

A pre-processing unit for a signal processor includes a pre-processing element. The pre-processing element is configured to receive data to be processed by the signal processor, to pre-process the receive data and to output the pre-processed data. The data is pre-processed based on a control signal describing an undesired signal characteristic of a supply voltage for the signal processor in order to compensate an influence of the signal characteristic of the supply voltage on the processing of the data.

24 Claims, 5 Drawing Sheets

PRE-PROCESSING UNIT FOR A SIGNAL PROCESSOR

BACKGROUND

A mobile communication device comprises a transceiver enabling the communication to a base station within the mobile communication network. The transceiver typically comprises a signal processor which is configured to process the outbound communication signal. The processing may comprise digital-to-analog conversion and amplifying the outbound communication signal. So, the signal processor may comprise a power amplifier. Such power amplifiers have to deliver high output power at high efficiency. For example, a cellular power amplifier has a peak output power which should be at 30 dBm (corresponding to approx. 1 W). Assuming an efficiency of 30 to 50% for the power amplifier, the power dissipation of same amounts to 2 or 3 W. In order to increase the battery life as much as possible the supply power is normally delivered by a switched DCDC converter which is used as a power supply having low power dissipation and which may be configured for envelope tracking. However, the DCDC converter may influence the outbound communication signal.

SUMMARY

The pre-processing unit for a signal processor comprises a pre-processing element. The pre-processing element is configured to receive data to be processed by the signal processor to pre-process the received data and to output the pre-processed data. The data is pre-processed based on a control signal describing an undesired signal characteristic of a supply voltage for the signal processor in order to compensate for an influence of the signal characteristic of the supply voltage on the processing of the data.

A pre-processing unit for a signal processor comprising an amplifier comprises a pre-processing element. The pre-processing element is configured to receive amplitude data to be processed by the signal processor, to pre-process the received amplitude data and output the pre-processed amplitude data. The amplitude data is pre-processed based on a control signal describing an undesired ripple within a supply voltage for the signal processor in order to compensate for an influence of the ripple of the supply voltage on the processing of the amplitude data. The control signal is based on information on a pulse width modulation value and/or on a pulse width modulation phase. The supply voltage is a DC voltage output by a DCDC converter forming the power supply.

A transceiver comprises a signal processor, a DCDC converter and a pre-processing unit. The signal processor comprises an amplifier and/or a digital-to-analog converter. The DCDC converter forms a power supply for the signal processor and outputs a supply voltage. The pre-processing unit for the signal processor comprises a pre-processing element configured to receive data to be processed by the signal processor, pre-process the received data and output the pre-processed data. The data are pre-processed based on the control signal describing an undesired signal characteristic of the supply voltage for the signal processor in order to compensate for an influence of the signal characteristic of the supply voltage on the processing of the data.

A method for pre-processing data to be processed by a signal processor comprises receiving the data, and pre-processing the received data based on a control signal describing an undesired signal characteristic of a supply voltage for the signal processor in order to compensate for an influence of the signal characteristic of the supply voltage on the processing of data and outputting the pre-processed data.

DETAILED DESCRIPTION

Figure 1A:
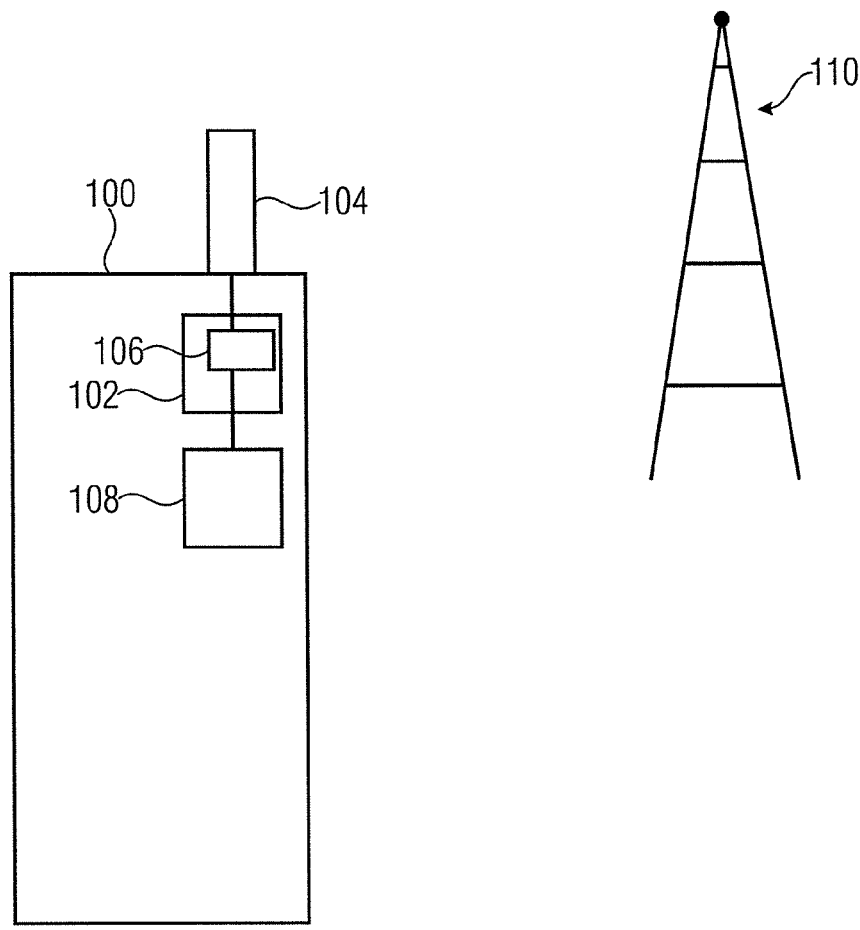
FIG. 1A shows a block diagram of an example mobile communication device.

FIG. 1A shows a block diagram of an example mobile communication device 100 comprising a transceiver 102. The part of the transceiver 102 coupled to an antenna 104 of the mobile communication device 100 is referred to as an RF front end 102. The RF front end 102 comprises a signal processor 106, like an amplifier 106, which is connected to a power supply 108.

The RF front end 102 of the transceiver enables the communication between the mobile communication device 100, e.g. a mobile phone or tablet PC, and a base station 110 via the antenna 104. The RF amplifier 106, e.g., a transistor network which may comprise a (RF) digital-to-analog converter, adds the purpose to amplify the RF communication signals exchanged between the mobile communication device 100 and the base station 110. In order to amplify the (outbound) communication signals up to a predetermined signal level, the power amplifier 106 is connected to a power supply 108 which provides the electrical energy, for example, a DC voltage, for the amplification.

The power supply 108 may be implemented as a DCDC converter which converts the battery voltage $V_{battery}$ of the battery pack of a mobile communication device 100 into a supply voltage $V_{out}$ for the RF amplifier 106 such that the supply voltage is nearly independent of the battery voltage $V_{battery}$ and as constant as possible. However, the DCDC converter produces undesired signal characteristics, like ripple, on the generated supply voltage $V_{out}$.

Figure 1B:
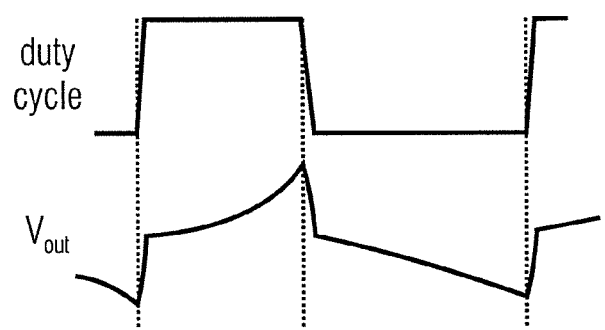
FIG. 1B shows a diagram of a supply voltage output by a power supply for illustrating an example undesired signal characteristics.

FIG. 1B illustrates such a supply voltage $V_{out}$ having the undesired signal characteristic, namely ripples. These ripples are caused by the switching DCDC converter which is based on the principle that energy is periodically stored and released in/from an energy storage, e.g., inductor or capacitor, wherein the periodic switching between storing and releasing is performed by a switch, e.g., a transistor arrangement such as an inverter. So, the supply voltage $V_{out}$ output by the DCDC converter depends mainly on a so-called duty cycle describing the switching (cf. diagram of FIG. 1B). Consequently, the supply voltage $V_{out}$ may be adapted by adjusting the duty cycle representing the time that the transistor arrangement is in an active state as a fraction of the total time. As illustrated by the comparison of the duty cycle and the supply voltage $V_{out}$, the ripples are caused at the point of time of the switching between the enable state and the disable state (storing/releasing of energy), and vice versa.

Due to the generated ripple, the power amplifier normally suffers from a bad power supply rejection ratio (PSRR). Therefore, a low dropout regulator (LDO) is typically placed between the DCDC converter 108 and the power amplifier 106 in order to suppress the ripples, wherein the LDO needs additional energy for operating. Hence, the DCDC converter was used to generate the supply voltage $V_{out}$ at least a few hundred mV higher than the needed supply voltage the for amplifier (signal processor). Another drawback of the LDO besides the energy consumption is the terminal noise which is generated by the same. For low noise, which is necessary to fill the spectral mask of the output signal of the signal processor, higher power for the control loop of the LDO is needed. Therefore, there is the need for an improved approach reducing the undesired signal characteristics and the energy consumption. This improved approach will be discussed referring to FIG. 2. Note that implementations of that improved approach may be applied to the communication device 100 of FIG. 1A and/or to the transceiver 102 of the communication device 100.

Figure 2:
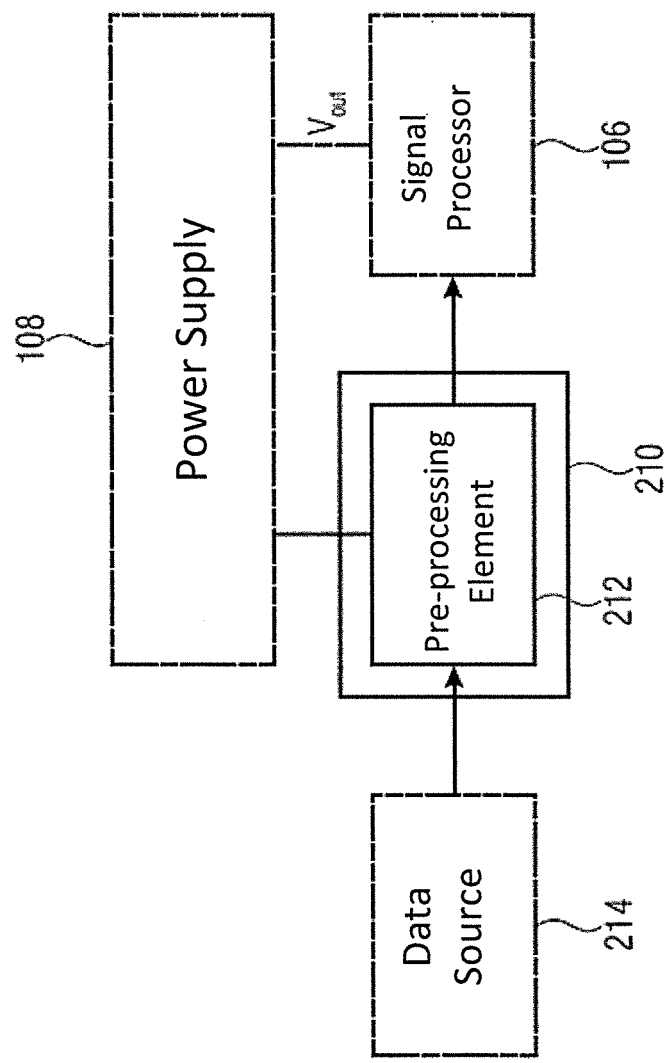
FIG. 2 shows a schematic block diagram of an example implementation of a pre-processing unit to an RF front end of a mobile communication device comprising and RF amplifier and a power supply.

FIG. 2 shows a first implementation of a pre-processing unit 210 enabling a suppression of the undesired signal characteristic. The pre-processing unit 210 comprising a pre-processing element 212 is applied to a signal processor 106 which is connected to the power supply 108. Note that the signal processor 106 and the power supply 108 are optional units and therefore illustrated by broken lines because the pre-processing unit 210 may also be applied to another signal processor configuration (e.g. a configuration having a power amplifier or having a DAC comprising an amplifier).

The pre-processing unit 210 is arranged between the input of the signal processor 106 and a data source 214 outputting the data to be processed by a signal processor 106. The data source 214 may, for example, be a baseband processor of the mobile communication device which outputs the data, e.g. digital amplitude data (in Cartesian or Polar coordinates) like I/Q data, to the signal processor 106 in order to transmit same via the communication network. So, the pre-processing element 212 which performs the pre-processing of the data comprises an input connected to the data source 214 and an output connected to the signal processor 106 for outputting the pre-processed data. Furthermore, the pre-processing element 212 has a control input for a control signal indicating the undesired signal characteristic of the supply voltage $V_{out}$. The control input may be connected to the power supply 108 which outputs the control signal.

As discussed above, the power supply 108 supplies the signal processor 106 with the supply voltage $V_{out}$ which may comprise the undesired signal characteristic like ripples. In order to correct the errors generated by the undesired signal characteristic and the ripple of the DCDC converter, respectively, the pre-processing element 212 is configured to pre-process or to pre-distort the data received from the data source 214 such that the errors are compensated by pre-processing the data. For example, the data may be amplitude data so that the amplitude of the data may be changed by a value depending on the amplitude of the ripple at a point of time when the ripple occurs in the supply voltage $V_{out}$. I.e., in case of a voltage overshoot, that the pre-processing element 212 reduces the amplitude of the data such that the signal output by the signal processor 106 has the shape of a signal output by a signal processor supplied with an ideal supply voltage. To sum up, the pre-processing element 212 of the pre-processing unit 210 enables the compensation of undesired signal characteristics by pre-distorting or pre-processing the data to be processed by the signal processor 106. As an advantage, the suppression of the undesired signal characteristic does not cause additional noise. Furthermore, this kind of undesired signal characteristic suppression is more energy efficient when compared to commonly used undesired signal suppression (e.g., LDO).

As mentioned above, the signal (data) pre-processed by the pre-processing element 212 (and processed by the signal processor 106) is a digital signal in one embodiment. So, the pre-processing elements 212 may be configured to digitally pre-process the data and may comprise a microcontroller or a CPU which performs the pre-processing. Furthermore, the pre-processing elements 212 may comprise a look-up-table storing respective scaling values associated with respective control signals. Consequently, the processing elements 212 may be configured to scale the amplitude data according to a respective scaling value dependent on the received control signal according to one embodiment.

Figure 3A:
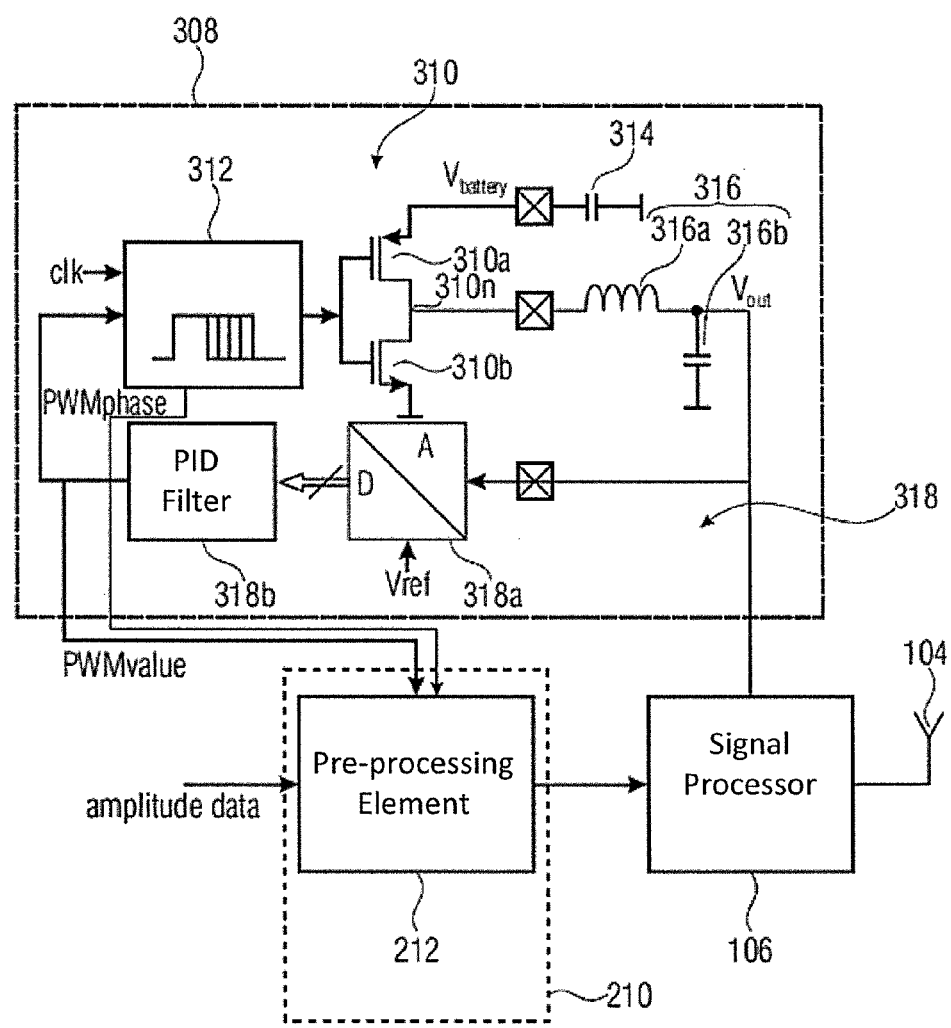
FIGS. 3A and 3B show schematic block diagrams of example implementations of the pre-processing unit in combination with the signal processor and a DCDC converter as power supply.

FIG. 3A shows a further implementation of the pre-processing unit 210 comprising a pre-processing element 212 which is configured to pre-process the amplitude data and to output the pre-processed data to the signal processor 106, e.g. a power amplifier comprising a (radio frequency) digital-to-analog converter. The signal processor 106 is connected to the antenna 104 and to a power supply 308 formed by a DCDC converter which comprises an inverter 310 and a digital controller 312 for the inverter 310.

Below, the structure and the functionality of the DCDC converter 308 will be discussed in detail before discussing the single aspects of the pre-processing unit 210. The inverter 310 comprises two transistors 310a and 310b, namely a first transistor 310a (e.g. a p-type transistor) and a second transistor 310b (e.g. an n-type transistor). The out contact (drain contact) of the first transistor 310a is coupled to the input contact (source contact) of the second transistor 310b via a common node 310n. Further, the first transistor 310a is connected to a battery pack 314 via its input contact, wherein the second transistor 310b is connected to ground via its output contact. The digital controller 312 is connected to the inverter 310 via the two control contacts (gate contacts) of the two transistors 310a and 310b in order to control the switching of same and, thus, the duty cycle. The supply voltage $V_{out}$ for the signal processor 106 is output via the node 310n and via an LC circuit 316. The LC circuit 316 comprises an inductor 316a (arranged between the node 310n and the signal processor 106) and a capacitor 316b coupled between one side of the inductor 316a and ground.

The supply voltage $V_{out}$ output via the LC tank 316 depends on the battery voltage $V_{battery}$ of the battery pack 314 and is controlled via a duty cycle control signal output by the digital controller 312 to the control contact of the two transistors 310a and 310b. The digital controller 312 generates a pulse width modulated signal by use of a clock signal and outputs same as the duty cycle control signal to the inverter 310. Here, in the case in which no envelope tracking is used, the inverter 310 may be operated with a relatively slow switching frequency set by the digital controller 312. This low switching frequency helps to increase efficiency of the DCDC converter. The switching frequency may be, for example, 1 MHZ or in a range between 0.5 MHZ and 2 MHZ. In contrast, the amplitude data in the digital-to-analog converter of the signal processor 106 is changed with 1 GHZ so 1000 times higher than the switching frequency of the DCDC converter 308.

For determining the duty cycle control signal, the power supply 308 comprises an analyzing path 318 which forms, together with the digital controller 312, a feedback loop. This analyzing path 318 is connected with a first side to the digital controller 312 and with its second side to the power supply output of the LC circuit 316 in order to tap the supply voltage $V_{out}$ which should be analyzed. The analyzing is performed by an analog-to-digital converter 318a which compares the supply voltage $V_{out}$ to a reference voltage $V_{ref}$. The analyzing path 318 may further comprise an optional PID filter 318b for stability reasons. This PID filter 318b (proportional integral derivate filter) may be arranged between the digital output of the analog-to-digital converter 318a and the digital controller 312. The analyzing path 318 or, in more detail, the PID filter 318b outputs a PWM value (pulse width modulation value) which is mainly a function of the ratio between the supply voltage $V_{out}$ and the battery voltage $V_{battery}$ and indicates a relative value of the supply voltage $V_{out}$. The pulse width modulated duty cycle control signal generated by the digital controller 312 is adapt based on this PWM value in order to increase or reduce the supply voltage $V_{out}$.

As discussed above, the pre-processing element 212 pre-processes the amplitude data in accordance with a control signal. The PWM value indicating the duty cycle includes an information on the value of the supply voltage $V_{out}$ based on which the amplitude of the ripple may be calculated. Background thereof is that the amplitude of the ripple is a function of the PWM value and of the supply power which is consumed by the signal processor 106, wherein the supply power of the signal processor 106 is calculable from the amplitude data. Therefore, assuming a known PWM value, it is possible to determine the error which is generated by the ripple and to correct same. Thus, the pre-processing unit 210 may be configured to calculate the undesired signal characteristic based on the PWM value and on the amplitude data. In other words, this means that the PWM value output by the analyzing path 318 may be used as a control signal indicating the amplitude of the undesired signal characteristic which should be compensated.

According to a further implementation, the pre-processing unit may comprise the analyzing path 318 for analyzing the supply voltage $V_{out}$ regarding ripple and generating the PWM value. It should be noted that the ripples are also influenced by the inductance 316a and the capacitance 316b but the values of these elements are not time dependent and so the system may typically be calibrated for these influences.

In order to time the amplitude adjustment performed by the pre-processing element 212 same may receive another control signal comprising a time information regarding the ripple. This time information may be determined based on a PWM phase signal which is output by the digital controller 312. Thus, the pre-processing element 212 comprises a second control input for the PWM phase and is configured to pre-process the amplitude data based on the PWM value and the PWM phase value or, in general, on a control signal indicating the amplitude of the undesired signal characteristic and/or on a further control signal indicating the point of time of the undesired signal characteristic.

According to a further implementation, the phase data of a LO generation may be corrected by the same principle if the ripple on the supply voltage $V_{out}$ leads to a phase change of the signal output by the signal processor 106. This correction of the so-called AM to PM error will be discussed referring to FIG. 3B.

Figure 3B:
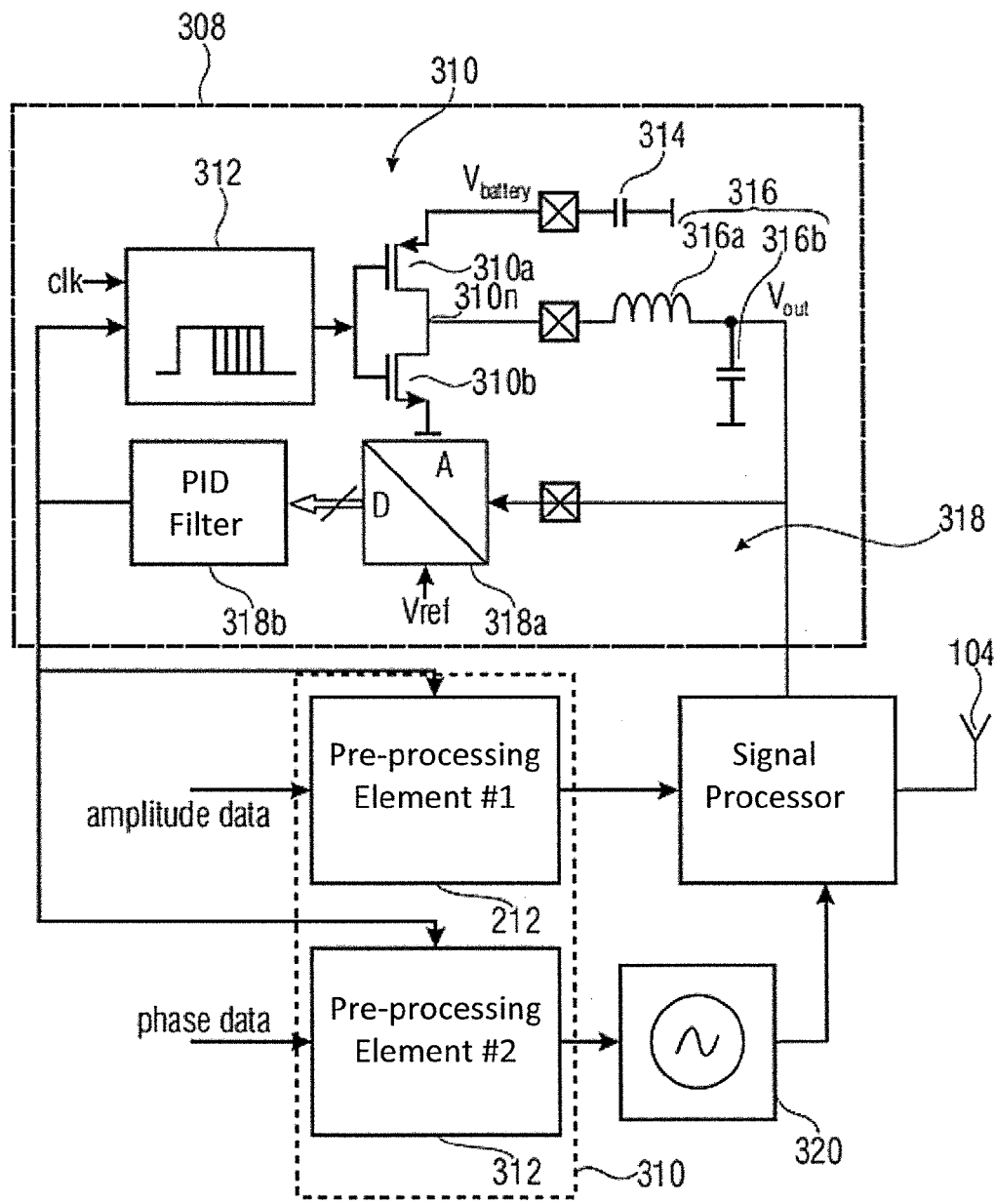

FIG. 3B shows a further implementation of a pre-processing unit 310 comprising the first pre-processing element 212 for pre-processing the amplitude data and a second pre-processing element 312 for processing phase data, which may be digital phase data or LO data. The first pre-processing element 212 is directly coupled to the signal processor 106, wherein the second pre-processing element 212 is coupled to the signal processor 106 via a voltage controlled oscillator (VCO) LO generator 320. Here, the first pre-processing element 212 and the second pre-processing element 312 receive the control signal, for example, the PWM value from the analyzing path 318 of the power supply 308.

The compensation of the errors caused by the undesired signal characteristic is substantially performed as discussed above, but separately for the amplitude and the phase, wherein the pre-processing element 312 changes (e.g., digitally) the phase of the phase data instead of the amplitude of the amplitude data. After pre-processing the phase data the same may be processed by the LO generator 320 and the signal processor 106. In order to time the amplitude and phase compensation the pre-processing unit 310 and thus the pre-processing elements 212 and 312 may be configured take the second control signal (PWM phase) into account.

Figure 4:
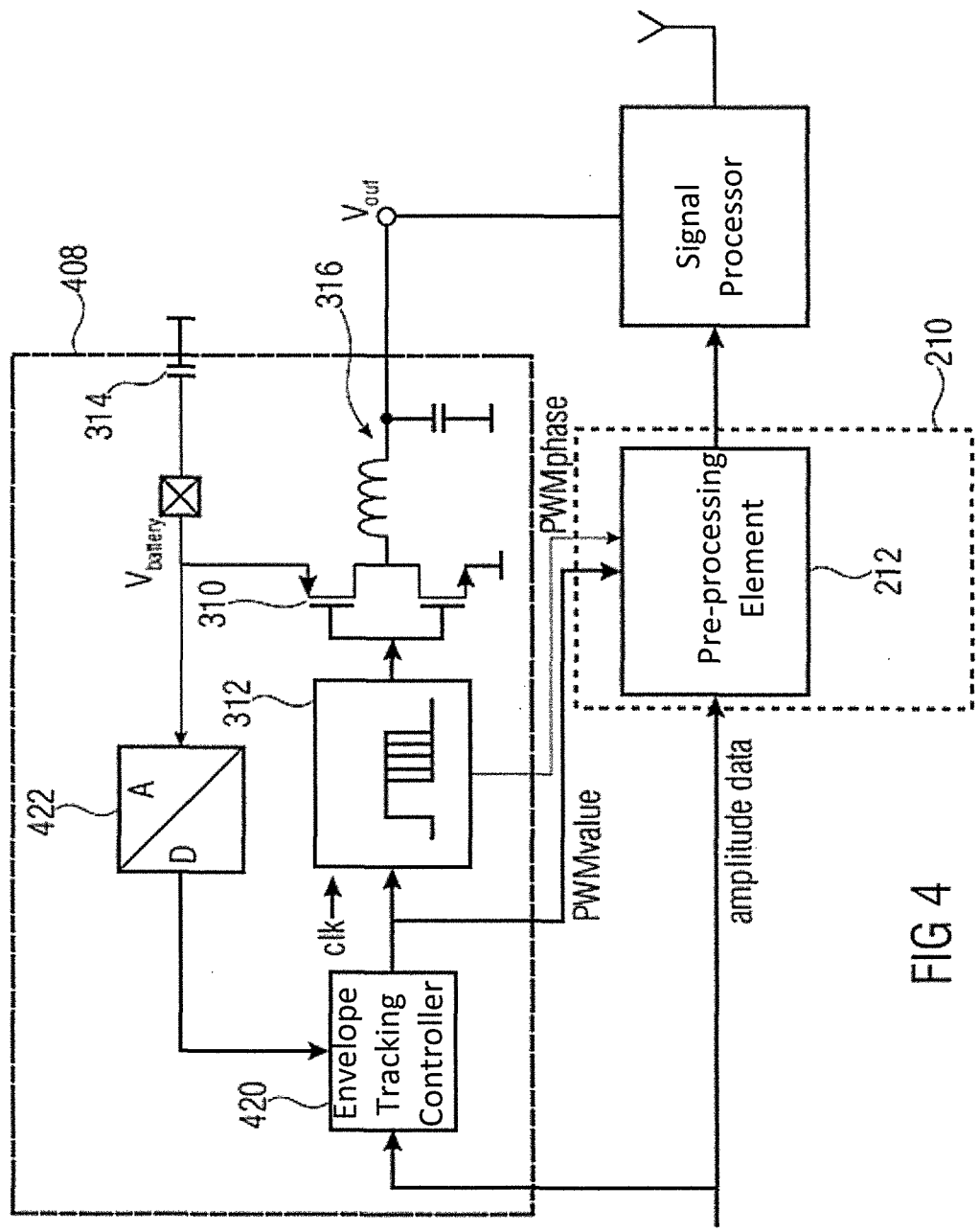
FIG. 4 shows a schematic block diagram of an implementation of a pre-processing unit in combination with a signal processor and a DCDC converter as power supply configured for envelope tracking.

FIG. 4 shows a further implementation of the pre-processing unit 210 which receives the PWM value and the PWM phase from the power supply 408. In detail, the PWM phase value is output by the digital controller 312 for the inverter 310, wherein the PWM value is output by a so-called envelope tracking controller 420, which will be discussed below.

In this implementation the power supply, comprising the digital controller 312, the inverter 310 and the LC circuit 316, is configured to perform envelope tracking. Envelope tracking enables to adjust the supply voltage $V_{out}$ dependent on the amplitude data. Therefore, the DCDC converter 408 comprises an envelope tracking controller 420 which is connected to the digital controller 312 and configured to output the PWM value to the digital controller 312 based on the amplitude data in order to adapt the supply voltage $V_{out}$. The envelope tracking controller 420 is configured to output the PWM value based on received amplitude data and based on information on the battery voltage $V_{battery}$, because the supply voltage $V_{out}$ depends on the battery voltage $V_{battery}$, as well. This information on the battery voltage $V_{battery}$ is provided by an envelope analog-to-digital converter 422 which is arranged between the battery 314 and the envelope tracking controller 420. In order to provide a high enough supply voltage $V_{out}$ the rate for adjusting the PWM values and thus the rate for adapting the supply voltage $V_{out}$ is increased. The update rate of the amplitude data may be approximately 1 GHZ and, therefore, still ten times higher than the switching rate of the DCDC converter 408.

It should be noted that the determination of the PWM value in the envelope tracking controller 420 may be based on a calculation based on the battery voltage $V_{battery}$ and on the amplitude data, wherein in one embodiment PWM values assigned to respective amplitude data and to battery voltages $V_{battery}$ are stored in a look-up table. Therefore, the envelope tracking controller 420 may preferably comprise a look-up table in one embodiment. As a consequence of this, the pre-processing unit 210 is configured to determine the undesired signal characteristic without an analyzing path, just based on a PWM value output by the envelope tracking controller 420, a PWM phase and the amplitude data.

According to a further implementation the pre-processing unit 210 may also comprise a further pre-processing element for pre-processing phase data as discussed with respect to FIG. 3B.

Although some aspects have been described in the context of an apparatus, it is clear that these aspects also represent a description of the corresponding method for suppressing an undesired signal characteristic, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some aspects, some one or more of the most important method steps may be executed by such an apparatus.

Although some implementations have been discussed in context of an amplifier as a signal processor, it should be noted that the signal processor may also be or may also comprise a digital-to-analog converter, which may be influenced by an undesired signal characteristic, or another device having a power supply which may generate an undesired signal characteristic. Furthermore, the implementations are not limited to a DCDC converters used as power supply. So, this above discussed suppression of the undesired signal characteristic may also be applied to further devices having a switching power supply (e.g. a ACDC converter) and suffering from a bad signal characteristic of the supply voltage.

Depending on certain implementation requirements, aspects of the disclosure can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

A data carrier having electronically readable control signals, which are capable of cooperating with a programmable computer system, such that one of the methods described herein is performed.

Generally, aspects of this disclosure can be implemented as a computer program product with a program code, the program code being operative for performing one of the methods when the computer program product runs on a computer. The program code may for example be stored on a machine readable carrier.

Other aspects comprise the computer program for performing one of the methods described herein, stored on a machine readable carrier.

In other words, a computer program having a program code for performing one of the methods described herein, when the computer program runs on a computer.

A further aspects of the present disclosure is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further aspects of the present disclosure is, therefore, a data stream or a sequence of signals representing the computer program for performing one of the methods described herein. The data stream or the sequence of signals may for example be configured to be transferred via a data communication connection, for example via the Internet.

A further aspect comprises a processing means, for example a computer, or a programmable logic device, configured to or adapted to perform one of the methods described herein.

A further aspect comprises a computer having installed thereon the computer program for performing one of the methods described herein.

A further aspect comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some aspects, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described aspects are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. A pre-processing unit for a signal processor, comprising:
a pre-processing element configured to receive data to be processed by the signal processor, pre-process the received data and output the pre-processed data,
wherein the pre-processing element is configured to pre-process the data based on a control signal describing an undesired signal characteristic of a supply voltage for the signal processor to compensate for an influence of the signal characteristic of the supply voltage on the processing of the data, and wherein the control signal is based on a calculation of a ratio between a battery voltage and the supply voltage, performed by the pre-processing element.

2. The pre-processing unit according to claim 1, wherein the pre-processing element is configured to pre-process amplitude data as the received data.

3. The pre-processing unit according to claim 2, wherein the pre-processing element is configured to pre-process amplitude data comprising digital amplitude data in at least one of Cartesian coordinates or polar coordinates or IQ data.

4. The pre-processing unit according to claim 1, wherein the pre-processing element is configured to pre-process phase data as the received data.

5. The pre-processing unit according to claim 4, wherein the pre-processing element is configured to pre-process phase data comprising at least one of digital phase data or local oscillator (LO) data.

6. The pre-processing unit according to claim 1, wherein the supply voltage is output by a direct current to direct current (DCDC) converter coupled to a battery pack that forms the power supply for the signal processor.

7. The pre-processing unit according to claim 6, wherein the DCDC converter comprises an envelope tracking circuit.

8. The pre-processing unit according to claim 7, wherein the control signal is output by the envelope tracking circuit.

9. The pre-processing unit according to claim 1, wherein the supply voltage is a DC voltage.

10. The pre-processing unit according to claim 1, wherein the pre-processing element is coupled to the signal processor.

11. The pre-processing unit according to claim 1, wherein the signal processor comprises an amplifier.

12. The pre-processing unit according to claim 1, wherein the signal processor comprises a digital-to-analog converter.

13. The pre-processing unit according to claim 1, further comprising a further pre-processing element for pre-processing phase data.

14. The pre-processing unit according to claim 13, wherein the further pre-processing element is connected to a local oscillator (LO) data generator comprising a voltage controlled oscillator which is arranged between the further pre-processing element and the signal processor.

15. The pre-processing unit according to claim 1, wherein the control signal is output by an analyzing path configured to analyze the supply voltage regarding the undesired signal characteristic and output the control signal.

16. The pre-processing unit according to claim 15, wherein the analyzing path comprises an analog-to-digital converter and a proportional integral derivative filter.

17. The pre-processing unit according to claim 1, wherein the control signal comprises information on a pulse width modulation value and/or on a pulse width modulation phase that is a function of the supply voltage.

18. The pre-processing unit according to claim 1, wherein the pre-processing element is configured to determine the supply voltage based on the received amplitude data.

19. A pre-processing unit for a signal processor comprising an amplifier, comprising:
a pre-processing element configured to receive amplitude data to be processed by the signal processor, pre-process the received amplitude data and output the pre-processed amplitude data,
wherein the amplitude data are pre-processed based on a control signal describing an undesired ripple within a supply voltage for the signal processor in order to compensate for an influence of the ripple of the supply voltage on the processing of the amplitude data,
wherein the control signal is based on information on a pulse width modulation value and/or on a pulse width modulation phase based on the supply voltage, wherein the control signal is output by an analyzing path that comprises an analog-to-digital converter and a proportional integral derivative filter,
wherein the supply voltage is a DC voltage output by a direct current to direct current (DCDC) converter forming the power supply.

20. The pre-processing unit according to claim 19, wherein the control signal is based on a calculation of a ratio between a battery voltage and the supply voltage, performed by the pre-processing element.

21. The pre-processing unit according to claim 19, wherein the pre-processing element is configured to pre-process amplitude data as the received data, wherein the pre-processing element is configured to pre-process amplitude data comprising digital amplitude data in at least one of Cartesian coordinates or polar coordinates or IQ data.

22. A transceiver, comprising:
a signal processor comprising an amplifier and/or a digital-to-analog converter;
a direct current to direct current (DCDC) converter forming a power supply for the signal processor and outputting a supply voltage; and
a pre-processing unit for the signal processor comprising a pre-processing element configured to receive data to be processed by the signal processor, pre-process the received data and output the pre-processed data, wherein the pre-processing element is configured to pre-process amplitude data as the received data, wherein the pre-processing element is configured to pre-process amplitude data comprising digital amplitude data in at least one of Cartesian coordinates or polar coordinates or IQ data,
wherein the data are pre-processed based on a control signal describing an undesired signal characteristic of the supply voltage for the signal processor in order to compensate for an influence of the signal characteristic of the supply voltage on the processing of the data.

23. The transceiver according to claim 22, wherein the control signal is based on a calculation of a ratio between a battery voltage and the supply voltage, performed by the pre-processing element.

24. A method for pre-processing data to be processed by a signal processor, comprising:
receiving the data;
pre-processing the received data based on a control signal describing an undesired signal characteristic of a supply voltage for the signal processor to compensate for an influence of the signal characteristic of the supply voltage on the processing of the data;
outputting the pre-processed data; and
calculating the undesired signal characteristic based on a battery voltage and the supply voltage or based on a battery voltage and the data comprising amplitude data.

* * * * *